May 20, 1958 F. L. MOSELEY 2,835,858
CURVE OR LINE FOLLOWER APPARATUS
Filed May 24, 1955 7 Sheets-Sheet 1

FIG_1

INVENTOR.
FRANCIS L. MOSELEY
BY
Christie, Parker & Hale
ATTORNEYS

May 20, 1958  F. L. MOSELEY  2,835,858
CURVE OR LINE FOLLOWER APPARATUS
Filed May 24, 1955  7 Sheets-Sheet 2

INVENTOR.
FRANCIS L. MOSELEY
BY
Christie, Parker & Hale
ATTORNEYS

May 20, 1958  F. L. MOSELEY  2,835,858
CURVE OR LINE FOLLOWER APPARATUS
Filed May 24, 1955  7 Sheets-Sheet 3

FIG_3A

FIG_3B

FIG_3C

FIG_3D

INVENTOR.
FRANCIS L. MOSELEY
BY
Christie, Parker & Hale
ATTORNEYS

May 20, 1958 — F. L. MOSELEY — 2,835,858
CURVE OR LINE FOLLOWER APPARATUS
Filed May 24, 1955 — 7 Sheets-Sheet 5

FIG. 5

INVENTOR.
FRANCIS L. MOSELEY
BY
Christie, Parker & Hale
ATTORNEYS

May 20, 1958 F. L. MOSELEY 2,835,858
CURVE OR LINE FOLLOWER APPARATUS
Filed May 24, 1955 7 Sheets-Sheet 6

INVENTOR.
FRANCIS L. MOSELEY
BY
Christie, Parker & Hale
ATTORNEYS

United States Patent Office 2,835,858
Patented May 20, 1958

2,835,858

CURVE OR LINE FOLLOWER APPARATUS

Francis L. Moseley, Pasadena, Calif., assignor to F. L. Moseley Company, Pasadena, Calif., a corporation of California Application May 24, 1955, Serial No. 510,746

20 Claims. (Cl. 318—31)

This invention relates, in general, to servo tracking systems and has reference more particularly to a transmission line or curve follower apparatus adapted to automatically track a line or curve defined by an electrical conducting element.

This application is a continuation in part of my co-pending application, Serial Number 390,942, filed November 9, 1953, for "Curve or Line Follower Apparatus," now abandoned.

One object of the present invention is to provide a novel tracking apparatus wherein a pick-up means is automatically operated to track an electrically conducting line or circuit.

Another object of the present invention is to provide a novel function generator constituting a curve follower apparatus adapted to produce a useful output signal which represents a function of the curve or trace which is tracked.

Another object of the present invention is to provide a novel curve or line follower apparatus wherein the curve conducts an electric current, the curve being tracked by an electrical pick-up which detects the current flow.

A further object of the present invention is to provide a novel curve or line follower apparatus for causing a pick-up means to follow a predetermined traverse in accordance with the location of an electrical conductor which is energized from a source of alternating current.

Still another object of the present invention is to provide a novel curve or line follower apparatus wherein the curve conducts an electric current, the curve being tracked by an electrical pick-up which detects the current flow, the output of the pick-up controlling a servomechanism system which operates to center the pick-up on the curve, the movement of the pick-up serving to control an output signal responsive to the shape of the curve.

These and other objects and advantages of the present invention will become more apparent from a perusal of the following specification taken in connection with the accompanying drawings wherein:

Figs. 3A to C, inclusive, are diagrammatic views of the pick-up coil portion of the apparatus shown in Fig. 1, the coil being shown in three different positions relative to the curve, while Fig. 3D is a graph of the voltage induced in the coil versus the displacement of the coil from the curve;

Figure 1:
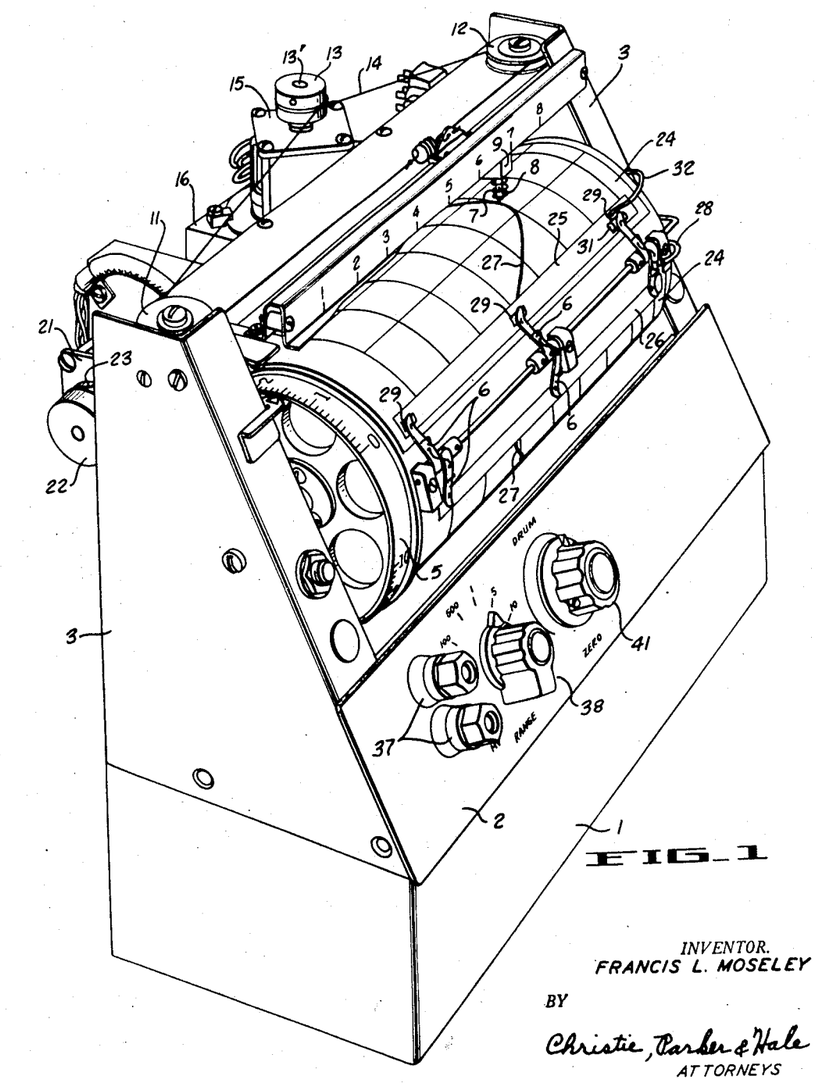
Fig. 1 is a perspective view from the front and side of one embodiment of the present invention wherein a curve on graph paper is tracked by a pick-up means.
Figure 2:
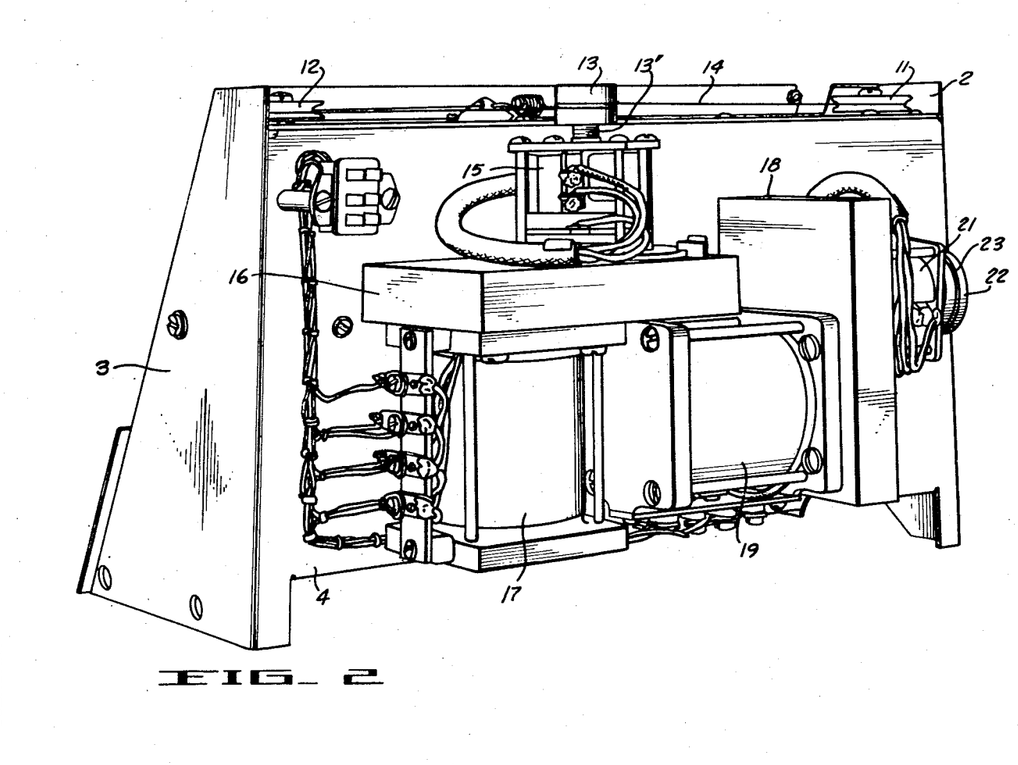
Fig. 2 is a perspective view from the rear of the novel apparatus shown in Fig. 1.

Referring now to Figs. 1 and 2, there is shown a curve follower apparatus which comprises a chassis including a base portion 1, front control panel 2, side panels 3 and a back panel 4. A drum 5 is rotatably mounted within the chassis, the drum being rotatable in either direction a distance slightly less than one revolution as represented by the numerical markings on the left hand edge of the drum (Fig. 1) and the associated pointer, the drum movement being fixed by suitable stops (not shown) located within the chassis. The drum is provided with spring-loaded clamps 6 arranged to clamp a sheet of graph paper around the surface of the drum. A small pick-up coil of wire 7 is wound on a small coil form 8 of a suitable material such as plastic or glass or, if desired, of magnetically permeable material to form a core, the coil form 8 being secured in a holder arm 9 which is slidably mounted on the chassis above the drum 5. The ends of the coil 7 extend within the chassis where they are connected in a circuit to be subsequently described. The lower end of the coil form 8 is spaced slightly from the surface of the drum. The holder arm 9 is spring-coupled to a positioning structure comprising idler pulleys 11 and 12, drive pulley 13, and the wire or cord 14 carried by these pulleys.

The drive pulley 13 is fixedly secured on a shaft 13' which is the drive shaft of a rheostat 15 secured on a metal base 16 on the back of the chassis. The rheostat shaft is gear coupled in base 16 to the drive shaft of an A.-C. two-phase reversible motor 17 which is also mounted on the base 16 and which is utilized for driving the pick-up coil. Secured on another metal base 18 on the back panel 4 is a drum drive motor 19 of the two-phase type which is gear coupled to another potentiometer 21, the shaft of which carries a drum drive pulley 22. The pulley 22 and associated wire or cord 23 are coupled to one end of the drum for rotating the same. Slip-clutches may be utilized with the motors so that no damage is inflicted should the motors continue rotating after the drive elements have reached their furthermost positions.

A sheet of graph paper 24 of the type which may be used in this device is shown secured on the drum 5 in Fig. 1. On each of two opposite edges of the paper 24 under the clamps 6 there are located strips 25 and 26 of an electrically conducting substance such as a suitable ink or paint. Extending on the graph paper from one strip to the other is a trace or curve 27 of the same or similar substance which may be made thereon by pen, brush or other suitable means. The metal clamps 6 which engage strip 27 are electrically connected to a lead wire or terminal 28. The clamps 6 associated with the strip 25 are insulated from the strip 25 by suitable insulators 29. Secured to the underside of one of these insulators 29 and engaging the strip 25 is an electrical contact 31 to which is securely affixed a lead wire 32.

Located on the front panel 1 are several control dials and terminals which are useful in connection with the operation and control of the electronic circuitry which is subsequently described.

Figure 4:
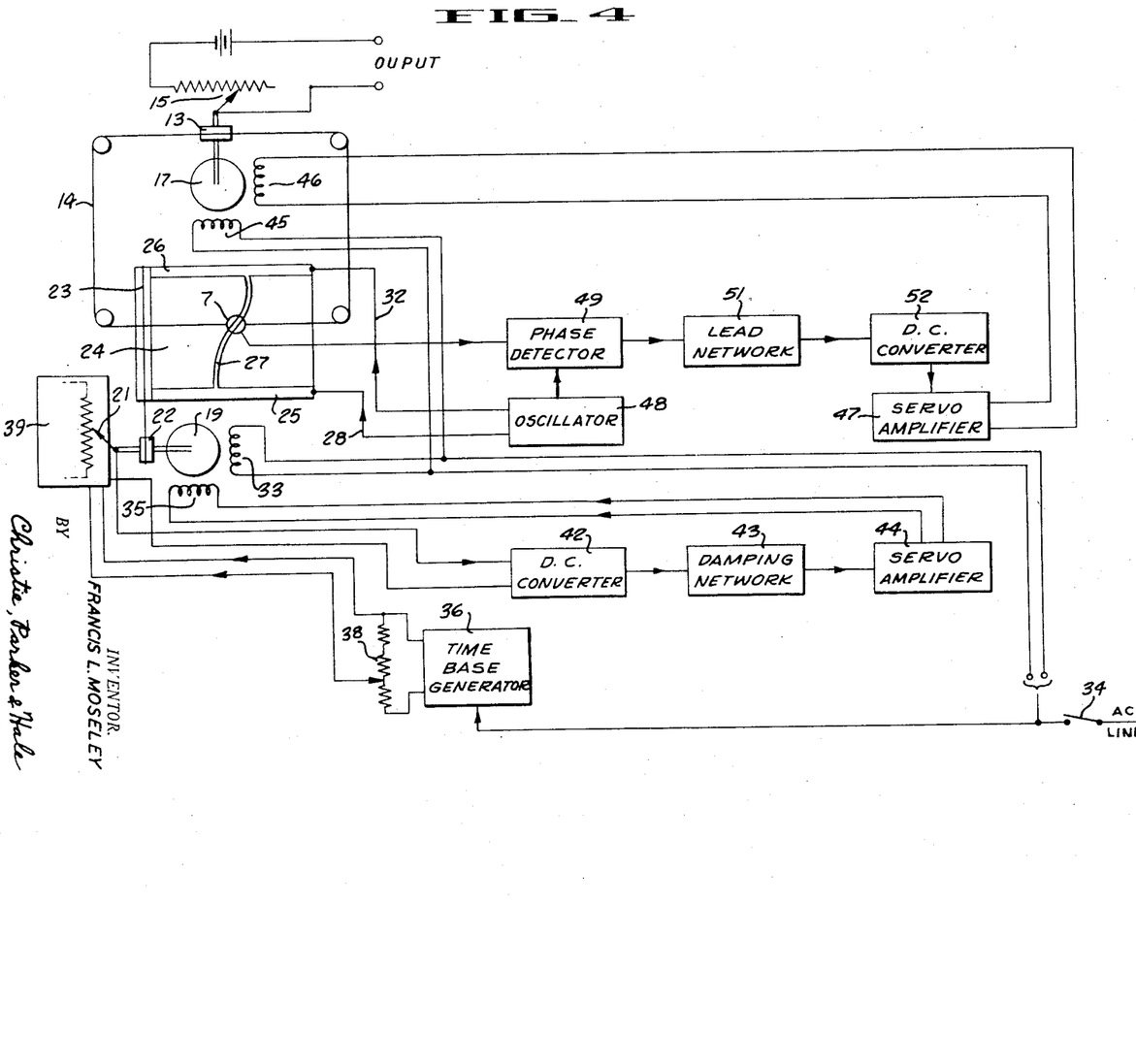
Fig. 4 is a block diagram of the electronic servo-mechanism system utilized in the present invention in driving the graph paper drum and the pick-up coil.

Shown in Fig. 4 is a block diagram of the novel electronic system which is utilized to control the drum and pick-up coil apparatus described above. The components of this system may be located within the chassis 1–4 or may be externally mounted. One of the stator windings 33 of the drum drive motor 19 is shown connected to a standard A.-C. supply line of, for example, 60 cycle, through a suitable main switch 34. The other stator winding 35 of the motor 19 is coupled to a time-base generator 36 through a servo-mechanism system which controls the operation of the drum drive motor 19.

The time base generator 36 produces a D.-C. voltage which is coupled through input terminals 37 (Fig. 1) across the range potentiometer 38, this D.-C. voltage having a certain initial value. The time base generator is such that at the will of the operator it will vary the D.-C. voltage from the initial value to some maximum value at some determined rate-of-change. For the present explanation we will assume that at the instigation of the operator by, for example, throwing a switch in the generator, the D.-C. output from the generator 36 will vary in a linear fashion from the initial value to some set maximum value. The range potentiometer 38 is provided so that time base generators having different maximum D.-C. outputs may be used.

The D.-C. output from the range switch 38 is transmitted to a balancing circuit 39, which includes the potentiometer 21 driven by the drum drive motor, the balancing circuit having a zero-set control incorporated therein. Such a balancing and zero-set circuit is fully disclosed and described in United States Patent #2,464,708 issued March 15, 1949, to the present inventor.

The drum 5 is first rotated to its initial or starting position, i. e., with the coil 7 very near to the strip 25, by means of the zero-set control or potentiometer 41 which is located on the front panel 2. This is done while the output from the time base generator is at the initial value of D.-C. voltage. The D.-C. reference voltage produced by the balancing circuit is adjusted by means of the zero control potentiometer 41 such that the D.-C. resultant or error signal voltage transmitted to the D.-C. converter 42 will be of the proper sign and magnitude to cause the servo system including the converter 42, damping or rate network 43 of the carrier rejection type, and servo amplifier 44 to function and cause the drum drive motor to operate and correctly position the drum at its initial or start setting. As the drum rotates to this desired position, the potentiometer 21 in the balancing circuit 39 is also operated to decrease the error signal to zero. A more detailed description of this well-known operation is found in the above cited patent.

When the switch in the time base generator 36 is thrown, the D.-C. output of the generator varies in a linear fashion, and the resultant D.-C. error signal transmitted to the servo system causes the A.-C. output from the converter to increase in magnitude, this A.-C. error voltage being coupled through the damping network 43 and servo amplifier 44 to the stator winding of drum drive motor 19. Thus, the drum 5 is driven at a linear speed which, for example, may be one revolution per second in a clockwise direction as viewed in Fig. 1. By releasing the switch in the time base generator and thus returning its D.-C. output to the initial value, the drum is rotated in a counter-clockwise direction and returned to its initial position.

Having now described the operation of the drum and its associated driving mechanism, the operation of the pick-up coil and associated apparatus will be explained. One stator winding 45 of the pick-up coil motor 17 is coupled to the A.-C. supply line while the other stator winding 46 is coupled to the output of a servo-amplifier 47. Coupled to the wires 28 and 32 leading to the electrically conducting strips 25 and 26 on the paper, which is shown flattened out in Fig. 4, is the output from an oscillator 48. The pick-up coil 7 is coupled to a phase-sensitive detector 49 to which the output from the oscillator 48 is also coupled. The output from the phase-sensitive detector 49 is coupled to a lead network 51, the output of which is coupled to a D.-C. converter 52. The A.-C. output from the converter is coupled through the servo-amplifier 47 to the stator winding 46 of the pick-up coil motor.

An explanation of the operation of this novel servo tracking system will be given now with reference to Fig. 4, followed by a more detailed description of the electronic circuitry which may be utilized in the novel system.

The oscillator 48 produces a fixed frequency output signal, such as 20 kilocycles, and transmits the signal over the leads 28 and 32 to the strips 25 and 26 and thus through the curve 27 bridging the strips 25 and 26. This output signal from the oscillator 48 is also transmitted to the phase-sensitive detector 49 for use as a reference signal therein.

The A.-C. current flowing through the conducting curve 27 will produce an A.-C. magnetic field which will couple the coil 7 and will induce voltages therein. If the coil 7 is positioned directly over the curve 27, no voltage will be induced in the coil, while if the coil is positioned to one side or the other of the curve a voltage will be induced therein, the phase of which will depend on which side of the curve the coil is and the amplitude of which will depend on the amount the coil is off-center of the curve. This will be more easily understood by referring to Figs. 3A, B and C where three transverse cross-section views of the curve 27 and the coil 7 are shown, with the coil in three different positions relative to the curve, and to the accompanying graph in Fig. 3D.

Figure 3A:
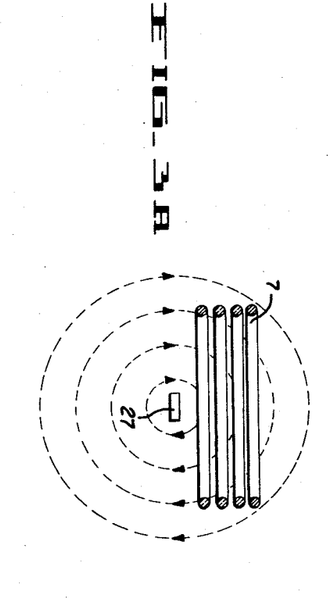

Fig. 3A shows the coil positioned directly over the curve; the flux produced around the trace 27 by the current flowing therein at one instant of time is shown in dotted lines. An equal number of flux lines cut the turns in the coil 7 in the upward direction and in the downward direction, and, therefore, voltages induced in the coil in one direction cancel voltages in the other direction and leave a zero resultant voltage.

Figure 3B:
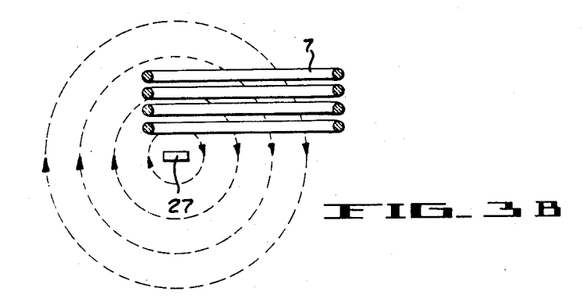
Figures 3C, 3D:
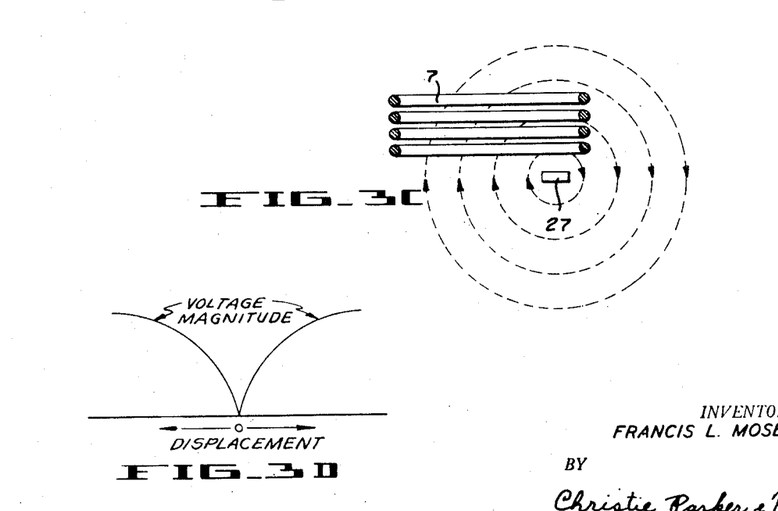

In Fig. 3B the coil is displaced to the right with respect to the trace 27 and it can be seen that more flux lines in a downward direction cut the turns of the coil than in the upward direction, and, therefore, a voltage is induced therein having one particular phase. In Fig. 3C, the coil is shown displaced to the left of the trace and more flux lines in the upward direction cut the turns of the coil than in the downward direction and thus induce an A.-C. voltage in the coil having a phase displaced 180° with respect to that of the voltage induced in the coil of Fig. 3B. The magnitude of the voltage induced in the coil is a function of the distance the coil is displaced, the voltage increasing as the coil moves off-center of the trace. This is better illustrated in Fig. 3D which is a plot of the magnitude of the voltage induced in the coil versus the coil displacement.

Therefore, the error signal voltage transmitted from the pick-up coil 7 to the phase-sensitive detector 49 will have a phase and a magnitude which are functions of the position of the coil with respect to the curve, the phase indicating the side of the trace 27 on which the coil is located and the magnitude of the current indicating the distance off-center. The phase-sensitive detector 49, in addition to receiving the A.-C. error signal from the coil 7, also receives a reference signal of the same frequency from the oscillator 48 so that it may determine the phase of the error signal. The phase-sensitive detector converts the A.-C. error voltage to a D.-C. error voltage. The D.-C. voltage output from the phase-sensitive detector 49 will have its sign dependent on the phase of the A.-C. error signal and its magnitude proportional to the magnitude of the A.-C. error voltage.

This D.-C. error signal is then transmitted to the lead network or "derivative-plus-proportional" control stage 51 which operates in response to the variations in error signal magnitude to produce derivative signals that insure that the servo-system will be properly damped in a well-known manner. Thus the coil 7 is prevented from over-shooting the trace 27 during periods when it is being centered on the trace from one side or the other thereof.

The D.-C. output signal from the lead network 51 is then transmitted to a converter stage 52 which converts the D.-C. error signal to an A.-C. signal of the proper frequency, in this case 60 cycle, to operate the coil driving motor 17. The A.-C. signal output from the converter is transmitted through an amplifier stage 47 to its associated stator winding 46 in the coil driving motor 17. Thus, the motor 17 will act in response to any error signals received to keep the pick-up coil centered over the curve.

The trace 27 on the graph paper 24 may be drawn to represent any particular function desired. For example, it may be an empirical curve having, for example, time for an abscissa. The drum 5 and thus the graph paper is rotated under the pick-up coil 7 at a steady time-based speed. The pick-up coil 7 moves horizontally across the drum in either direction to stay centered on the trace at all times. The coil driving motor 17, while operating to drive the coil 7 to keep it centered on the curve, also drives the shaft 13' on the function potentiometer 15 across which a standard voltage has been connected. The voltage output of the potentiometer is thus a function of the information stored in the graphical curve and can be used for carrying out operations responsive to the shape of such curve.

Figure 5:
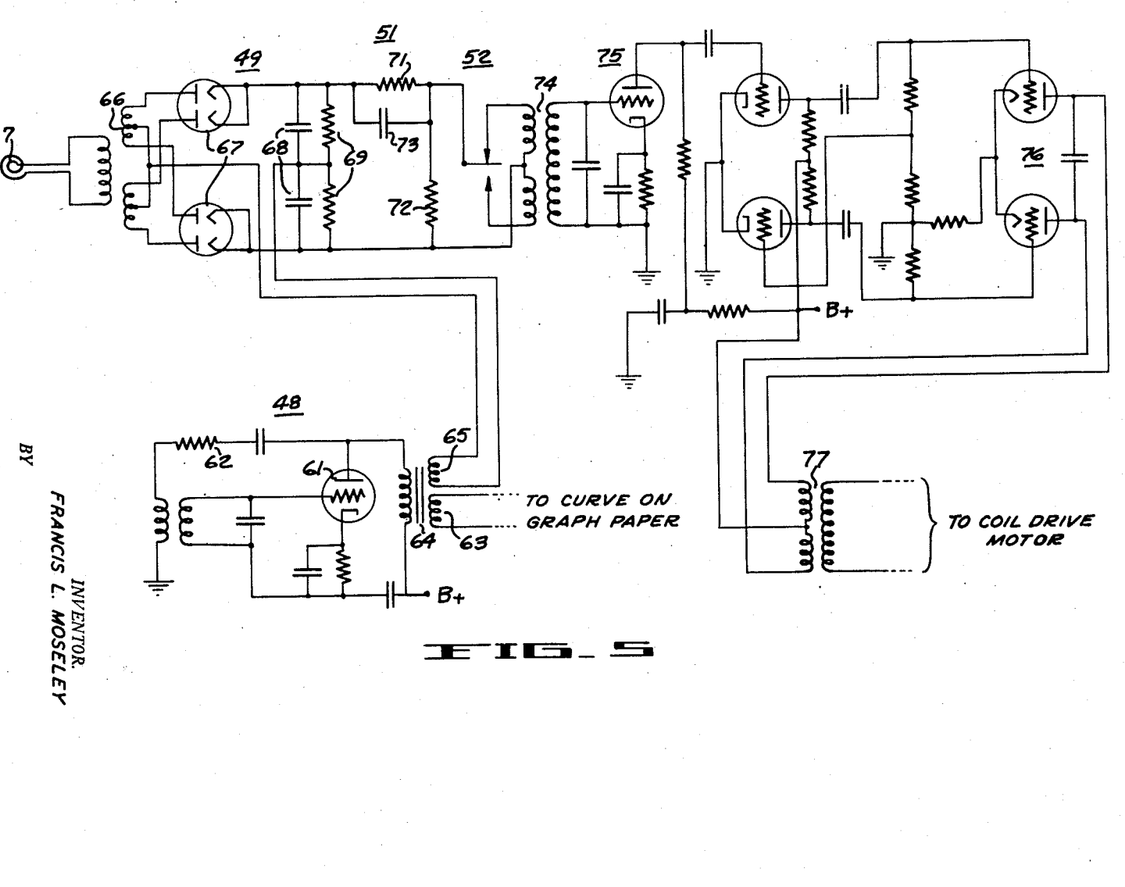
Fig. 5 is a schematic diagram of the electrical circuit components of the servo system shown in Fig. 4 used to control the pick-up coil.

Fig. 5 is a more detailed circuit diagram of the coil driving system shown in Fig. 4 wherein there is shown circuit elements which may be utilized to accomplish the above-described result. The 20 kc. signal is supplied by the oscillator 48 which comprises the triode tube 61 and associated feed-back circuit 62. The output from the oscillator 48 is coupled through one secondary winding 63 of output transformer 64 to the leads 28 and 32 and is also coupled through a second secondary winding 65 of transformer 64 to the phase-sensitive detector 49. The pick-up coil 7 is coupled through transformer 66 to the phase-sensitive detector which includes the two double diode tubes 67, condensers 68 and resistors 69. As explained above, this latter stage produces a D.-C. output voltage across its output terminals which may be of one sign or the other. The lead circuit 51 comprises the resistors 71 and 72 and the condenser 73, this being a network of a well-known rate taking type.

The output of this lead network 51 is coupled to the input of a standard type D.-C. converter or modulator circuit 52 which in this instance is of the vibrating reed type. The vibrator coil is driven from the 60 cycle A.-C. supply line and is thus synchronized with the remainder of the system. Thus the D.-C. error signal is converted to an A.-C. error signal of a proportional magnitude.

The output of the vibrator circuit is coupled through the transformer 74 to the servo-amplifier 47 which includes a full wave chopper amplifier 75 and a final push-pull power amplifier stage 76. The output of this servo-amplifier is coupled through a transformer 77 to the stator winding 46 on the coil drive motor.

In the above description, the drum 5 was driven at a constant speed due to the smoothly rising linear signal output from the time base generator. It should be understood, however, that the drum can be driven at other speeds linear or non-linear with time. The function output of one of these novel function generators could be used to drive the drum of a second function generator of this novel type in which case the rate of rotation of the drum on the second machine is determined by the curve or trace placed on the graph paper in the first function generator.

The function generator disclosed herein may be utilized as a computer input device, as a means for controlling the operation of mechanical apparatus such as cam cutters, etc.

Figures 6, 7:
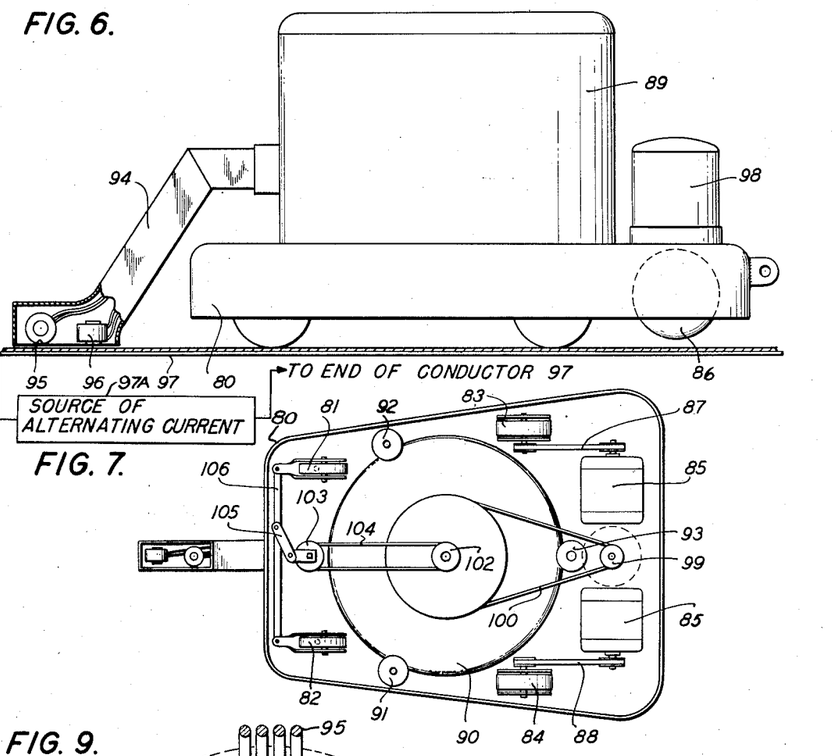
Fig. 6 is an elevational view of an embodiment of the invention which is adapted to follow predetermined traverse in accordance with the location of an electrical conductor energized from a source of alternating current.
Fig. 7 is a bottom view of the embodiment of the invention of Fig. 6.

In Fig. 7 there is shown a vehicle including an embodiment of the invention for following a predetermined path along a conducting wire energized from a source of alternating current. The vehicle includes a dolly 80 supported on a pair of steering wheels 81, 82 and a pair of drive wheels 83, 84.

In operation, the drive wheels 83 and 84 are driven from the drive motors 85 and 86, via the drive belts 87 and 88, and the path of travel of the vehicle is determined by the position of the steering wheels 81 and 82. On top of the dolly 80 there is a housing 89 which rests on a turntable 90. The turntable 90 is rotatably supported by means of grooved rollers 91, 92, 93 attached to the dolly 80. Attached to the housing 89 is an extension 94 which bears the pick-up coils 95 and 96. In a manner similar to that described above in connection with the description of the curve follower of Fig. 1, the coil 96 provides a signal in accordance with the position of an electrical conductor 97 which is energized with alternating current from a suitable source 97a such as the oscillator 48 of Fig. 5. The conductor 97 may be laid beneath the surface as shown, or if desired, may be suspended above the vehicle, in which case, the extension 94 should preferably extend upwardly. The coil 95 functions to pick up a reference wave from the conductor 97 which may be compared with the error signal provided by the coil 96 by means of a suitable control circuit such as that shown in Fig. 8. The apparatus of Fig. 8 may be mounted within the housing 89.

In accordance with the comparison, a steering motor 98 mounted at the rear of the dolly 80 may be suitably energized. The steering motor 98 drives the turntable 90 by means of a pulley 99 and a belt 100. As the steering motor 98 turns the turntable 90 the extension 94 is angularly moved toward the alternating current energized conductor 97.

In addition to driving the turntable 90, the steering motor 98 drives a pulley 102, which in turn drives a steering wheel pulley 103 via a belt 104. The steering wheel pulley 103 is adapted to steer the wheels 81 and 82 via a crank arm 105 and a connecting rod 106. Thus, when the steering motor 98 is energized, the extension 94 is directed towards the conductor 97 and the steering wheels 81 and 82 are positioned so that the vehicle is driven by the drive motors 85 and 86 along a path defined by the conductor 97.

Figure 8:
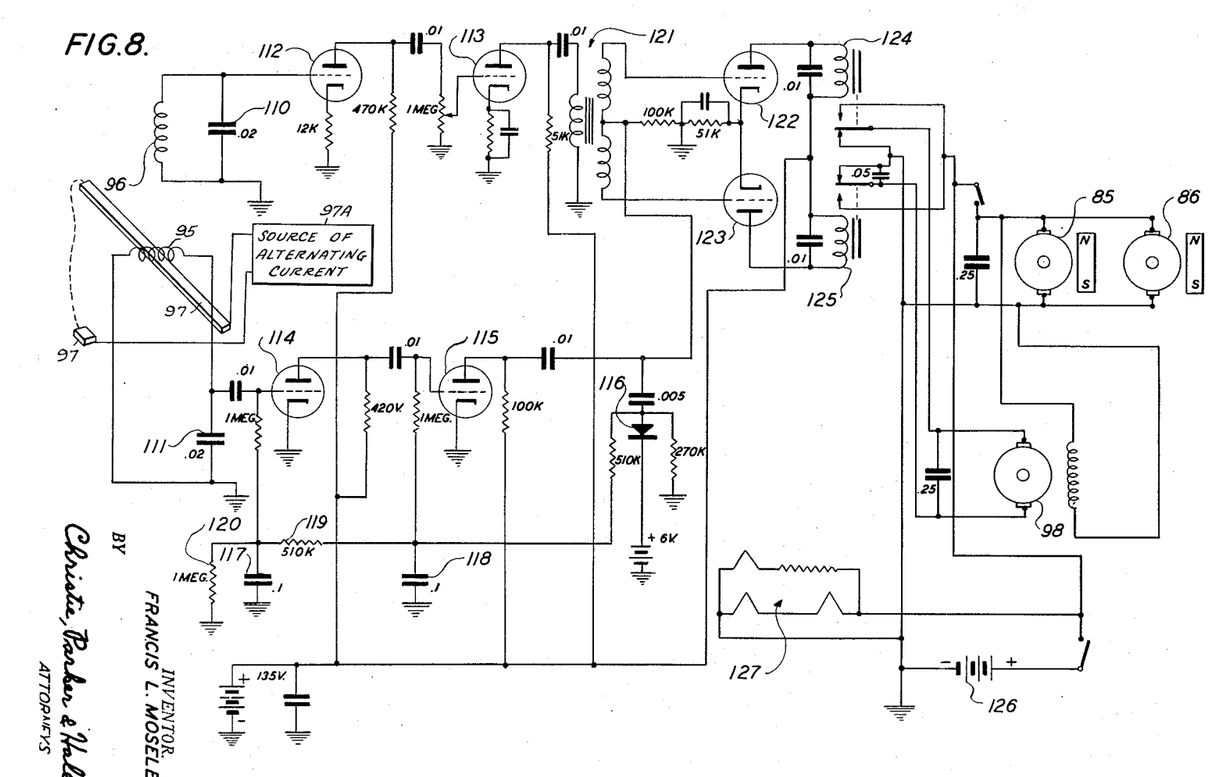
Fig. 8 is a schematic circuit diagram of the embodiment of the invention of Fig. 6.

Fig. 8 illustrates one control circuit which may be used in the embodiment of the invention shown in Fig. 6 to energize the steering motor in accordance with the error signal and the reference wave provided by coils 95 and 96. In order to increase the sensitivity of the pick-up coils, the capacitors 110 and 111 are connected to provide parallel resonant circuits at the frequency of the alternating current energizing the conductor defining the traverse to be followed by the vehicle. As described in detail with respect to Fig. 3, the coil 96 provides an error signal of reversible phase and variable amplitude in accordance with its position with respect to the conductor 97.

Figure 9:
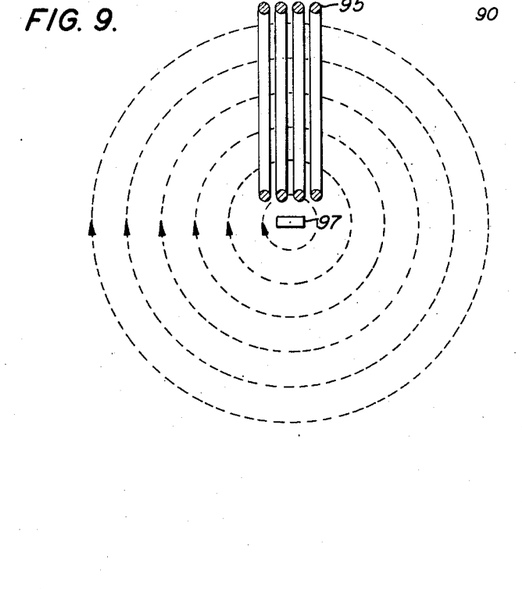
Fig. 9 is a diagrammatic view of the reference wave pick-up coil of the embodiment of Fig. 6 illustrating the orientation of the coil relative to the field generated by an electrical conductor energized from a source of alternating current.

The coil 95 picks up a reference wave of fixed phase due to the fact that the coil is oriented with respect to the conductor 97 so that all the flux lines pass through the coil in the same direction at any given instant. (The orientation of the coil 95 with respect to the conductor is shown in Fig. 9.) Since the flux lines pass through the coil 95 in the same direction so long as the coil 95 remains above the conductor, the induced voltage in the coil 95 will be a reference wave having a fixed phase.

In the control circuit of Fig. 8, the error signal from the coil 96 is amplified by the electron tubes 112 and 113 which are connected to form a conventional two stage amplifier. In like manner, the reference wave from the coil 95 is amplified by the electron tubes 114 and 115.

In order to compensate for variations in amplitude of the reference wave, an automatic gain control circuit is provided in which the output wave from the electron tube 115 is rectified by a diode 116 and applied as a variable bias to the control electrodes of the electron tubes 114 and 115 via a filter circuit comprising the capacitors 117 and 118 and the resistors 119 and 120. The effect of the automatic gain control circuit is to maintain the amplitude of the reference wave appearing at the output of the electron tube 115 substantially constant over a range of variation in amplitude of the reference wave provided by the coil 95.

The error signal appearing at the output of the electron tube 113 is applied to the primary winding of a transformer 121 having a center tapped secondary winding. The transformer provides an error signal of one phase across one-half of the secondary winding and an error signal of opposite phase across the other half of the secondary winding. By applying the reference wave from the electron tube 115 to the center tap of the secondary winding, the effect is such that the reference wave is additive with respect to the error signal in one-half of the secondary winding and subtractive with respect to the error signal in the other half of the secondary winding.

The electron tubes 122 and 123 are connected to the secondary winding, so that one of them is rendered conducting in response to the signal appearing across the half of the secondary winding in which the error signal and the reference wave are additive.

Across the output of each of the electron tubes 122 and 123 is connected a relay coil 124 and 125, respectively, which operates a set of contacts when energized. The sets of contacts are arranged to apply a voltage from a battery 126 to the steering motor 98 to cause it to rotate in one direction or the other depending upon the relay coil which is energized. Thus, in overall operation the control circuit of Fig. 8 functions to energize the steering motor 98 in a direction determined by the error signal from the coil 96. In addition, Fig. 8 shows connections by means of which the drive motors 85 and 86 and the heater windings 127 of the electron tubes 112, 113, 114, 115, 122 and 123 may be energized from the battery 126. Where double triode electron tubes are used, only three heater windings 127 are required, as shown.

In Fig. 8 the values of the resistors are given in ohms where $k=1000$ and meg=megohms, the values of the capacitors are given in microfarads, and the values of the potentials are given in volts (v.). These values are given by way of example, being indicative only of one successful embodiment.

It is contemplated that the embodiments of the invention illustrated herein may be employed to advantage in any application where it is desired to cause apparatus to follow a path determined by an alternating current energized conductor. In illustrating one embodiment (Fig. 1, 2 and 4) in which the energized conductor is transported, and another embodiment (Figs. 6, 7 and 8) in which the energized conductor is stationary, it is believed that a basis is given upon which modifications to adapt the invention to any given use may be readily made without departing therefrom.

I claim:

1. In combination, a transmission line arranged to carry an alternating current, a pick-up means associated with the line in which a signal is adapted to be produced due to the current flow in the line, the phase and magnitude of the signal being determined by the position of the pick-up means relative to the transmission line, servo means for moving the pick-up means relative to the line, and means for controlling the servo means operated responsive to the signals produced in the pick-up means for centering the latter on the transmission line.

2. The combination as claimed in claim 1 wherein said pick-up means includes a coil of wire having a voltage induced therein due to the current flow in the line.

3. The combination as claimed in claim 2 wherein said means for controlling the servo means includes a phase-sensitive detector coupled to the coil, a rate circuit coupled to the output of the phase-sensitive detector and a servo-amplifier coupling the output of the rate circuit to the servo means whereby the latter is driven in response to the output from the servo-amplifier.

4. In combination, a transmission line, a source of alternating current coupled to the line, the current flowing in said line and producing an alternating magnetic field enveloping the line, a pick-up means associated with the line having a voltage induced therein by the magnetic field, first driving means for moving said line relative to the pick-up means in a first general direction, second driving means for moving said pick-up means relative to said line in another general direction, means coupled to the pick-up means and the second driving means operated responsive to the voltages induced in the pick-up coil for operating said second driving means to move said pick-up means in a direction and at a rate determined by the voltages induced.

5. The combination defined in claim 4 wherein voltage means is provided operated in response to said second driving means producing a signal constituting a function of the contour of said line traced at a rate determined by the speed of said first driving means.

6. In combination, means for producing a radio frequency current, a transmission line coupled to said means through which said current is transmitted, a coil associated with said line having a voltage induced therein from said line, and a phase-sensitive detector coupled to said coil and to said oscillator, the output of the phase-sensitive detector being a D.-C. voltage, the sign and the magnitude of which indicates the location of the coil relative to the line.

7. In combination, means for producing a radio frequency current, a graph paper having an electrically conducting trace thereon, a pick-up coil associated with the paper, a first means for moving the paper relative to the coil in one direction, a second means for moving the coil relative to the paper in another direction, circuit means coupling said radio frequency producing means to said trace whereby radio frequency current is transmitted through said trace, the current flow in the trace inducing a voltage in the pick-up coil, and a phase-sensitive detector coupled to the pick-up coil and to the radio frequency producing means responsive to the voltage induced in the pick-up coil for controlling the said second means to cause the pick-up coil to center on the trace.

8. The combination defined in claim 7 comprising potentiometer means coupled to said second means for producing an output voltage variable with time and in accordance with variations in the shape of said trace.

9. In combination, a transmission line, means for producing an alternating current coupled to said transmission line, the current flow in said line producing an alternating magnetic field enveloping the line, a pick-up means associated with said line having a voltage induced therein due to the alternating magnetic field, driving means for producing relative movement between said pick-up means and said transmission line, and means coupling said pick-up means to said driving means operative responsive to the voltage induced therein for controlling the relative movement between the pick-up means and transmission line.

10. The combination as claimed in claim 7 wherein said pick-up means includes a coil of wire.

11. A curve follower for tracking a curve conducting an alternating current comprising a pick-up coil associated with the curve and having a voltage induced therein due to the current flow in the curve, driving means including a reversible motor for moving the coil relative to the curve, a phase detector coupled to the coil for receiving the voltage induced therein and comparing its phase with the phase of the current in the curve, the output of the phase detector being a D.-C. voltage, the sign of which depends on the phase of the voltage induced in the coil with reference to the phase of the current in the curve and the magnitude of which depends on the magnitude of the voltage induced in the coil, a servo-amplifier system comprising a rate circuit and an amplifier coupling the output of the phase detector to the reversible motor, the motor rotating in a direction and at a speed determined by the phase and magnitude of the output of the phase detector to move the coil so as to be centered over the curve, and variable voltage producing means driven from said motor.

12. A curve follower comprising a drum on which a sheet of graph paper having an electrically conducting curve may be fastened, the curve extending generally in the direction of rotation of the drum, a motor for rotating said drum, a servo control system including a damping network coupled to the input of the motor whereby said drum may be rotated at any desired fixed or variable rate of speed responsive to input signals to the follower, an oscillator circuit for supplying an A.-C. current to said curve, the current flow in the curve producing an A.-C. flux enveloping the trace, a pick-up coil associated with the drum extending over the paper, a second motor for moving the coil in either direction lengthwise of the drum, the pick-up coil having an A.-C. voltage induced therein due to the A.-C. field enveloping the curve, the phase of the induced voltage being dependent on the side of the curve on which the coil is positioned at any one time and the magnitude of the induced voltage being dependent on the distance the coil is displaced from directly over the curve, and a servo control system including a phase-sensitive detector and a damping circuit coupling the coil to the second driving motor whereby the motor is driven in response to the voltage induced in the coil to center the coil over the curve.

13. A curve follower as defined in claim 12 comprising potentiometer means driven from said driving motors for producing control output voltages respectively variable in accordance with the rate of rotation of said drum and with changes in the contour of said curve produced at the rate of rotation of said drum.

14. In a line following system, an electrically conductive reference line for connection to a source of low frequency alternating current to provide a magnetic field about said line, a magnetic scanning head, means for moving said scanning head along said line, electromagnetic means associated with said scanning head for providing an induced voltage upon lateral displacement of said head relative to said line, and means responsive to the phase and magnitude of said voltage to return said scanning head to a predetermined position relative to said line during movement along the path of said line.

15. In a line following system, an electrically conductive reference line for connection to a source of alternating current to provide a magnetic field about said line, a magnetic scanning head, means for moving said scanning head along said line, electromagnetic means associated with said scanning head for providing an induced voltage upon angular misalignment of said head relative to said line, and means responsive to the phase and magnitude of said induced voltage to rotate said scanning head to realign it with said reference line during movement of said head along said line.

16. In a line following system, an electrically conductive reference line, a source of current for said line to provide a magnetic field about said line, a magnetic scanning head, means for moving said scanning head along said line, electromagnetic means associated with said scanning head for producing induced voltages upon improper alignment and positioning of said head relative to said line, and means responsive to the phase and magnitude of said voltages to move said scanning head transversely and angularly to maintain its alignment and position relative to said line during movement of said head along said line.

17. Apparatus for following a predetermined path, including in combination an electrical conductor which is adapted to be energized from a source of alternating current, a first pick-up coil for providing an error signal in accordance with the location of the first pick-up coil relative to the conductor, a second pick-up coil for providing a reference wave, means comparing the error signal from said first pick-up coil with the reference wave from said second pick-up coil, and means coupled to said comparison means for moving said first pick-up coil in accordance with the comparison.

18. In apparatus for traversing the length of an alternating current energized conductor, the combination of a first pick-up coil oriented with respect to said conductor to provide an error signal in accordance with its location relative to the conductor, a second pick-up coil which is adapted to provide a reference wave derived from the alternating current energized conductor, a comparison device coupled to said first and second pick-up coils for comparing the error signal with the reference wave, and means coupled to said comparison device for transporting the pick-up coils and the conductor relative to one another.

19. In apparatus for traversing the length of an alternating current energized conductor, the combination of a first pick-up coil adapted to provide an error signal in accordance with the location of the pick-up coil relative to the conductor, a second pick-up coil for deriving a reference wave from said alternating current energized conductor, a comparison device coupled to said first and said second pick-up coils for providing an output signal in response to the relationship between said error signal and said reference wave, and a servo system connected to said comparison device for centering said pick-up coil relative to said conductor in response to said output signal.

20. Apparatus for traversing the length of an alternating current energized conductor, including in combination a vehicle, a first pick-up coil which is angularly and transversely movable supported by said vehicle, said first pick-up coil being adapted to provide an error signal in accordance with its location relative to said alternating current energized conductor, a second pick-up coil carried by said vehicle and oriented with respect to said conductor to provide a reference wave, a comparison device connected to said first and said second pick-up coils for providing an output signal in accordance with the relationship of said error signal and said reference wave, and means coupled to said comparison device for directing said first pick-up coil and said vehicle along said conductor in response to said output signal.

<center>No references cited.</center>